Figure 1:
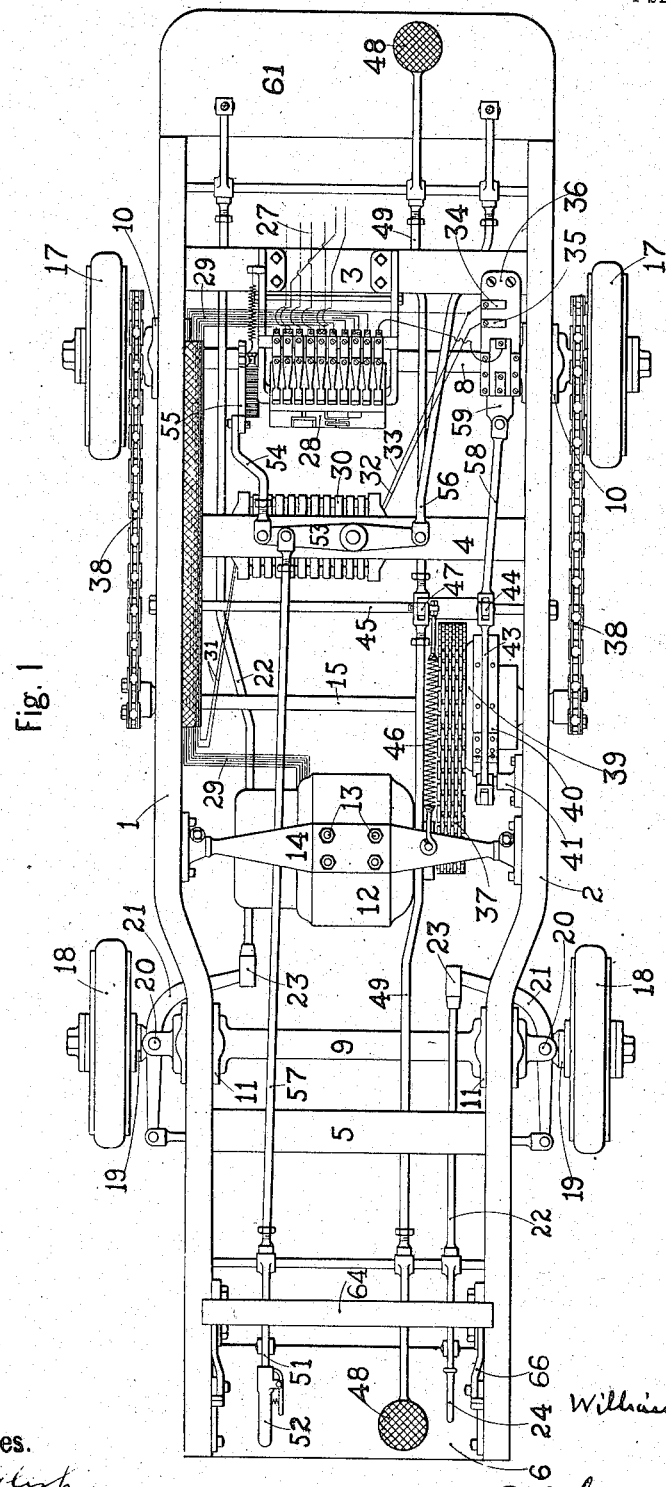

W. C. CARR.
TRUCK.
APPLICATION FILED APR. 16, 1913.
1,129,954.
Patented Mar. 2, 1915.
4 SHEETS—SHEET 2.
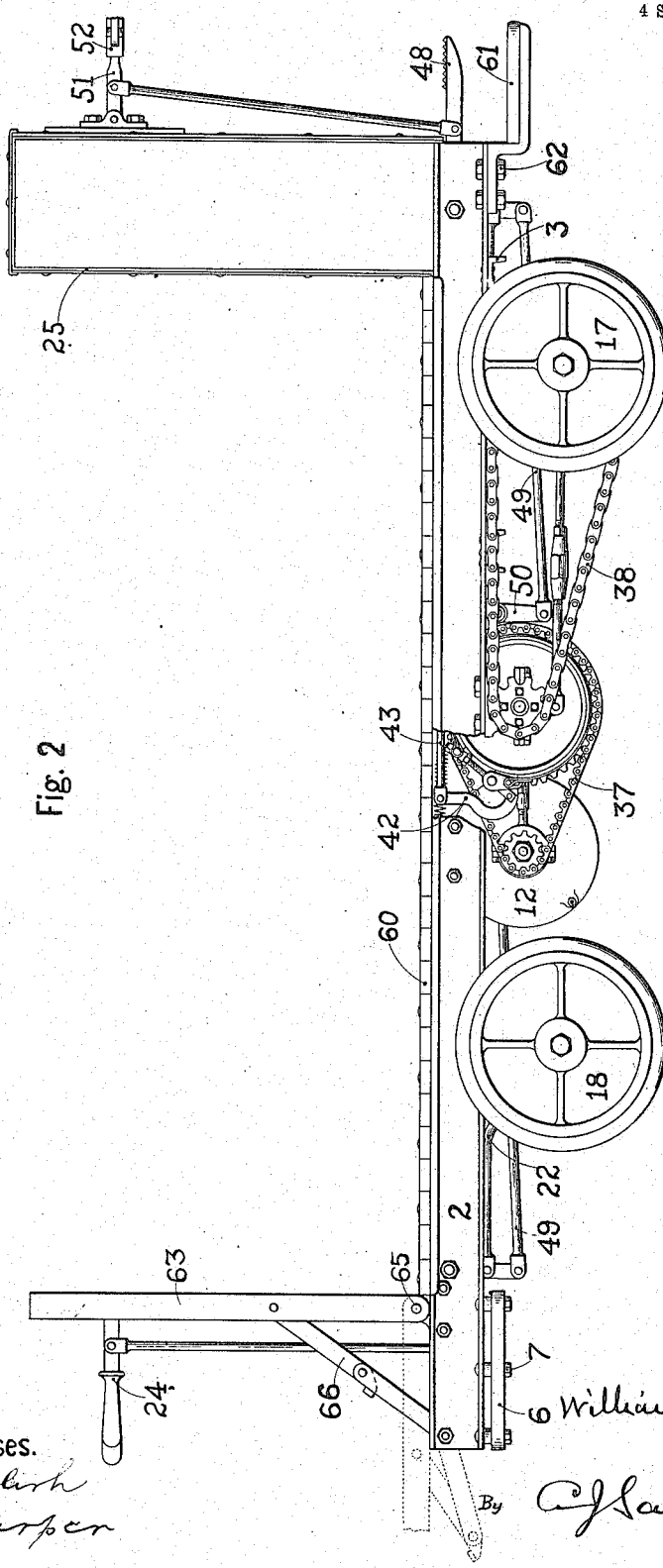
Fig. 2
Witnesses.
H. W. English
D. H. Harper
Inventor.
By ... Langston
Attorney

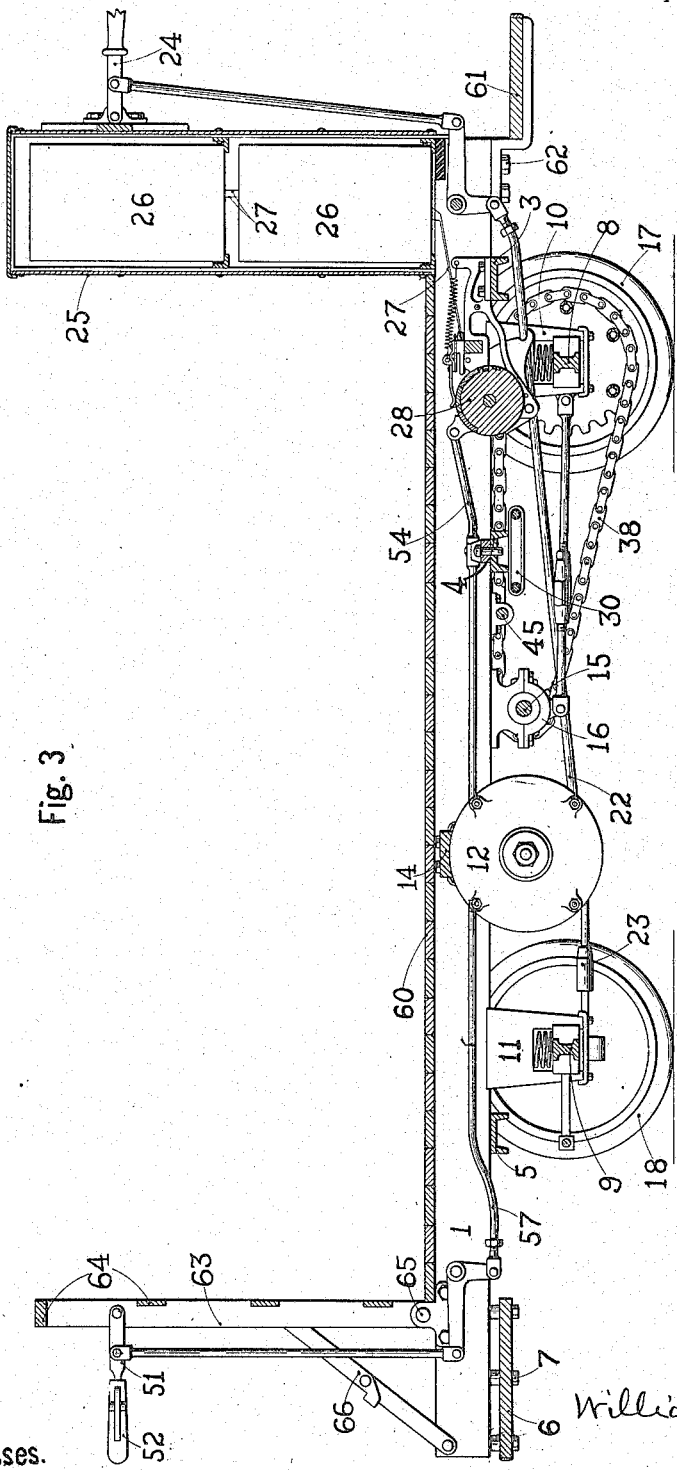

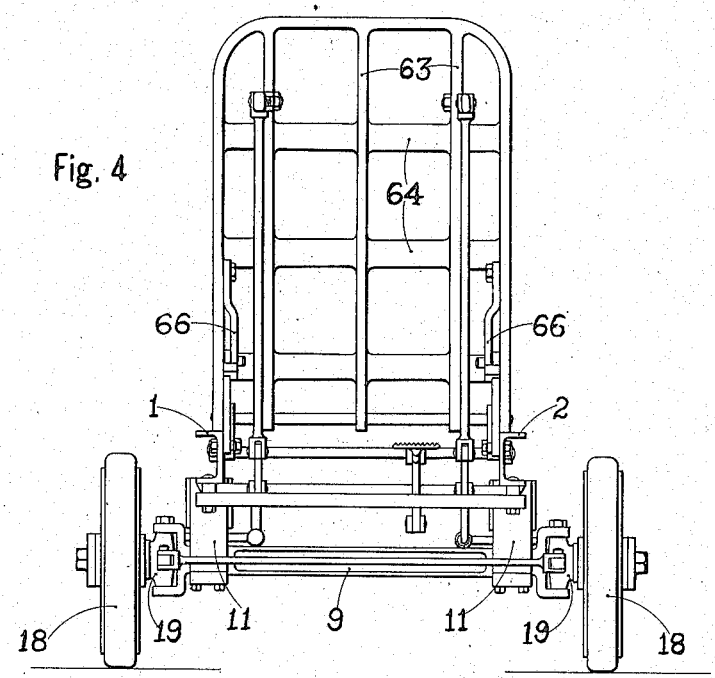
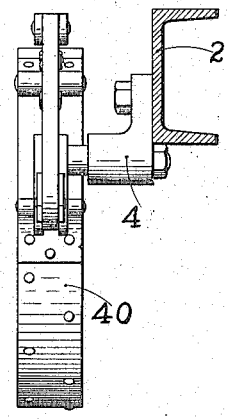
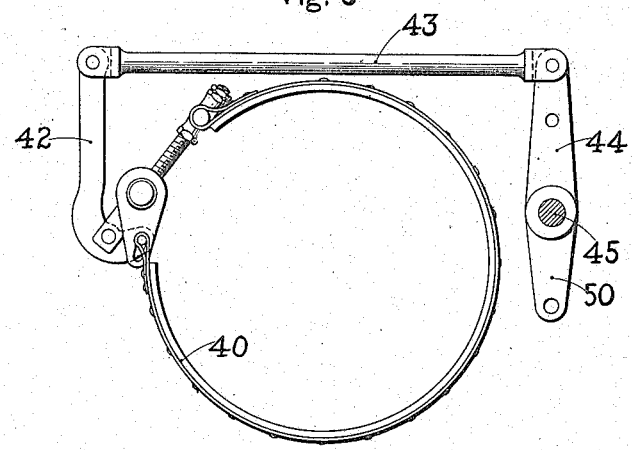

UNITED STATES PATENT OFFICE.

WILLIAM C. CARR, OF BUFFALO, NEW YORK.

TRUCK.

1,129,954.     Specification of Letters Patent.     Patented Mar. 2, 1915.

Application filed April 16, 1913. Serial No. 761,450.

*To all whom it may concern:*

Be it known that I, WILLIAM C. CARR, a citizen of the United States, residing at Buffalo, in the county of Erie and State of New York, have invented certain new and useful Improvements in Trucks, of which the following is a specification.

This invention relates to certain improvements in trucks and primarily to self-propelled trucks adapted chiefly for indoor or factory use in expeditiously handling and transporting goods short distances.

One of the features of the invention resides in the arrangement of the operating mechanism beneath the floor of the truck and between the two longitudinal side beams of the truck frame; said operating mechanism being distributed at various points between the longitudinal side beams and being located a suitable distance above the ground, and also beneath the flat floor of the truck.

Another feature consists in the arrangement of a box-like compartment for a storage battery or other propelling mechanism at one end of the truck frame and attaching a short supplementary end platform to the lower end of the box which projects laterally therefrom forming a support upon which the operator is adapted to stand, the improvement also consisting in attaching a starting, stopping, reversing, speed-changing and steering elements to the box near the upper end thereof and within convenient reach of the operator's hands.

Another feature consists in arranging a folding frame extension at one end of the truck frame opposite the box or compartment for the storage battery or other propelling medium, said folding frame extension being adapted to be placed either in upright position to constitute a vertical end gate at one end of the main frame or to be turned down into a horizontal position to form a prolongation of the truck frame and thereby provide additional supporting surface, and in attaching to said folding frame extension a second set of starting, stopping, reversing, speed-changing and steering elements so that the truck may be operated equally well from either end.

The invention also relates to certain details of construction, which will be hereinafter described, reference being had to the accompanying drawings in which a preferred adaptation of the invention is shown.

Figure 1 is a top plan view of the improved truck. Fig. 2 is a side elevation of the improved truck showing the folding frame extension located at one end of the truck in its upright position in full lines and a fragment thereof in horizontal position in dotted lines. Fig. 3 is a vertical longitudinal section through the improved truck. Fig. 4 is an end elevation of the improved truck with the folding end frame extension turned up in its vertical position. Fig. 5 is an enlarged detached edge view of the brake band and its operating connections and levers. Fig. 6 is an enlarged detached side view of the brake band and its operating connections and levers.

In referring to the drawings in detail, like numerals designate like parts in the adaptation of the invention shown.

The main frame of this improved truck preferably consists of two longitudinal side beams, 1 and 2 of channel iron, and a series of transverse beams extending between and connecting the longitudinal side beams. The transverse beams comprise an end beam, 3, an intermediate beam, 4, and an end beam, 5. Besides these connecting transverse beams a fairly wide, flat support, 6, is extended transversely across between the ends of the longitudinal beams being secured thereto by bolts or other fasteners, 7. This fairly wide, flat transversely extending support forms a support at one end of the truck upon which the operator is adapted to stand. Two axles, 8 and 9 are supported in depending boxes 10 and 11, attached to the longitudinal beams, as shown in Figs. 1, 2 and 3. A rotary electric motor, 12, is fastened in suspended position by bolts, 13, to a cross bar, 14, which extends between and is detachably attached to the longitudinal beam, as shown in Fig. 1. A counter shaft, 15, is journaled in bearings, 16, attached to the longitudinal side beams, as shown in Figs. 1, 2 and 3. The axles, 8 and 9 are of a stationary character, and have their outer ends projecting beyond the longitudinal side beams. Supporting wheels are rotatably mounted on the outer projecting ends of the axles and are four in number. Two of the supporting wheels are driven from the motor and constitute the propelling wheels of the truck, while the other two rotate freely and are so constructed that they may be turned to steer the truck.

The propelling pair of wheels are indicated on the accompanying drawings by the numeral, 17, and the free-running steering wheels by the numeral, 18. In order that the steering wheels may be turned to steer the truck, portions 19 of the outer end of the axle, 9, are formed separately from the axle proper and are joined or connected to the same by pivotal joints, 20, as shown in Fig. 1.

The steering is accomplished by means of angular bars, 21, which are connected rigidly at intermediate points to the short pivotal portions, 19, and at their inner ends to longitudinal connecting rods, 22. Two of the angular bars, 21, are employed, one being connected to each of the portions, 19, and two connecting rods, 22, are also employed, one of said connecting rods being attached at its inner end by a movable joint, 23, to the inner end of one of the angular bars, 21, and having its outer end extending to one end of the truck and attached to the operating handle, 24. The other connecting rod, 22, is connected by a similar movable joint, 23, to the inner end of the other angular bar, 21, and extends to the opposite end of the truck where it is connected to a similar operating handle, 24. From this it will be noted that the truck may be steered equally well from either end.

The means for and manner of starting, stopping, reversing and changing the speed of the truck is as follows:—A box or compartment, 25, is located at one end of the truck and is of a fairly narrow vertical form being arranged transversely across the ends and forming a housing for a storage battery, 26, a support for the various operating handles and levers and a vertical projecting end for the truck platform. The storage battery, 26, is connected by a series of wires, 27, to an electric controller, 28, and the electric controller, 28, is in turn connected by a series of wires 29, to the electric motor, 12. A resistance element, 30 is attached to one of the transverse beams of the truck frame and is connected by wires, 31, to the controller and by wires, 32, and 33, to two slightly separated metal pieces, 34, and 35, mounted on a strip of insulating material, 36, secured to the truck frame. The axle of the motor, 12, is connected to the counter shaft, 15, by a chain and sprocket gearing, 37, as shown in Figs. 1 and 2, and the outer projecting end of the counter shaft is likewise connected by a chain and sprocket gearing, 38, to the propelling wheels of the truck, as shown in Figs. 1 and 2.

A brake is arranged on the counter shaft and is preferably constructed as shown in Figs. 1, 2, 5 and 6. This brake consists of a disk, 39, which is mounted on the counter shaft and a brake band, 40, encircling said disk. The brake band is pivotally supported at one end from the truck frame by a pivot element, 41, and is adapted to be contracted around the disk by means of an angular connecting bar, 42, which draws the two ends of the brake band toward each other. The angular bar, 42, is connected by a connecting rod, 43, to a crank, 44, which is pivotally mounted on a transverse bar, 45. The crank, 44, is rocked to set the brake by the tension of a spring, 46, which is fastened at one end to a transverse member of the frame and at the opposite end to an extension, 47, attached to the crank.

A means for manually releasing the brake is provided which is arranged to be operated from either end of the truck. This means consists of foot treadles, 48, located at opposite ends of the truck and connected to the outer ends of connecting rods, 49, which extend to and connect at their inner ends to an extension, 50, of the crank, 44, as shown in Fig. 1.

The controller is operated from either end to vary the speed or reverse the direction of travel of the truck. This is accomplished by means of levers 51, to which handles, 52, are detachably secured, as shown in Fig. 1. A lever, 53, is pivotally mounted on one of the frame members as shown in Fig. 1 and has one end thereof connected by a connecting rod, 54, to a gear mechanism, 55, for turning the controller. A connecting rod, 56, extends from the opposite end of the lever, 53, and is connected to the lever, 51 located at the opposite end of the truck. The lever, 51, located at the opposite end of the truck is likewise connected to the lever, 53, by a connecting rod, 57, said connecting rod, 57, being connected to said lever at a point in proximity to the lever joint thereof to the lever, 54.

Means is provided by which the electric circuit is automatically broken by the setting of the brake and is automatically completed by the releasing of said brake. This improved means forms a part of the subject matter of a companion application of even date, so that but a brief description of the same will be given herein. A connecting rod, 58, extends from the crank, 44, being connected at its inner end to said crank and at its outer end to a slide, 59. A floor or platform, 60, which is preferably formed of matched boards is arranged upon the truck frame, as shown in Fig. 2. A laterally projecting end platform or support, 61, for the operator is attached to the lower end of the box, 25, being bolted thereto by bolts, 62, as shown in Fig. 2. A folding end extension is arranged at the end of the truck opposite the box, 25, and is adapted to be turned up into vertical position, as shown in full lines in Fig. 2, or down in horizontal position, as shown in dotted lines, to constitute a prolongation of the supporting platform.

Referring to Fig. 4 it will be noted that the end extension is a skeleton frame composed of longitudinal members, 63, and transverse members, 64. The lower ends of the longitudinal side members, 63, are pivoted to the main truck frame by pivot pins, 65, as shown in Fig. 2, and to lock the end extension in its vertical position, jointed connecting bars, 66, are pivoted at one end to the end extension and at the opposite end of the truck frame, as shown in Fig. 2. When the end frame extension is in its vertical position, the jointed bars, 66, are straight and extend diagonally from the end extension to the truck frame, as shown in full lines in Fig. 2. To turn the end frame extension, it is first necessary to bend the two members of the jointed bars, 66, at their joints or connection and then move the frame extension downward into the position shown in dotted lines in Fig. 2. When the end frame extension is in a horizontal position, the members of the jointed bars, 66, are bent nearly parallel with each other, as shown in Fig. 2. The slide 59, is slidably mounted on the insulating strip, 36, and is adapted to be moved into contacting and connecting position with the portions, 35 and 36, when the brake band is expanded and the brake is released, thereby electrically completing the circuit.

The operation of this improved truck will be clearly understood by referring to the accompanying drawings. In starting the truck, the operator first presses his foot upon one of the treadles, 48, and forces it down. This expands the brake band, releasing the brake and also moves the slide, 59, electrically completing the circuit. It will be noted by referring to Fig. 1 that the wire, 67, connects the slide to the controller so that when the slide is in contacting position with both of the portions 35 and 36, the truck is automatically started at its slowest speed in one direction. The truck's speed is varied or its direction of travel changed, in other words, reversed by movement of the detachable operating handles, 52.

The truck is steered from either end by the handles 24. When it is desired to stop, the pressure on the foot treadle 48, is removed permitting said treadle to move upward and the tension of the spring, 46, to automatically set the brake. This movement also automatically moves the slide, 59, breaking the electrical circuit.

With this improved truck all or nearly all of the operating mechanism is arranged and concealed beneath the floor of the truck and is supported from or between the two longitudinal side beams, the controlling means is so arranged that the truck may be started, stopped, reversed or the speed varied from either end of the truck.

I claim,

1. A truck of the class described consisting of a frame, a platform or floor on said frame, a vertical box at one end of said frame, a folding end extension at the opposite end of said frame, a set of controlling elements attached to the vertical box, a second set of controlling elements attached to the folding end extension, operating mechanism arranged beneath the platform or floor, and a storage battery in the vertical box.

2. In a truck of the class described a frame, a vertical box arranged at one end of said frame, forming an inclosing housing for a storage battery, a transverse gate or wall for the truck end and a support for the truck controlling elements, and a short supplementary laterally extending platform attached to the lower end of the box and forming a support for the operator.

3. In a truck of the class described, the combination with the frame, of an end extension frame pivoted to the end of the frame proper, and adapted to be placed in an upright position to constitute an end gate or in a horizontal position to form a prolongation of the frame proper, and truck steering and controlling elements attached to said end extension.

4. In a truck of the class described, a frame having a box at one end and a pivotal end extension frame at the opposite end, operating mechanism supported from the frame, a storage battery in the box, and controlling elements for said operating mechanism arranged in two sets with one set attached to the box and the other set attached to the end frame extension.

WILLIAM C. CARR.

Witnesses:
EDGAR L. KLEINDINST,
LOUISE C. BLATZ.